(12) United States Patent
Oaki (10) Patent No.: US 7,764,825 B2
(45) Date of Patent: *Jul. 27, 2010

(54) PATTERN INSPECTION APPARATUS AND METHOD WITH ENHANCED TEST IMAGE CORRECTABILITY USING FREQUENCY DIVISION SCHEME

(75) Inventor: Junji Oaki, Kanagawa (JP)

(73) Assignee: Advanced Mask Inspection Technology Inc., Yokohama-shi (JP)

( * ) Notice: Subject to any disclaimer, the term of this patent is extended or adjusted under 35 U.S.C. 154(b) by 886 days.

This patent is subject to a terminal disclaimer.

(21) Appl. No.: 11/567,520

(22) Filed: Dec. 6, 2006

(65) Prior Publication Data

US 2008/0050007 A1    Feb. 28, 2008

(30) Foreign Application Priority Data

Aug. 24, 2006    (JP) .............................. 2006-227348

(51) Int. Cl.
*G06K 9/00* (2006.01)
(52) U.S. Cl. ...................................... 382/149
(58) Field of Classification Search ........................ None
See application file for complete search history.

(56) References Cited

U.S. PATENT DOCUMENTS

| 6,678,404 | B1 * | 1/2004 | Lee et al. ..................... 382/155 |
| 6,804,381 | B2 * | 10/2004 | Pang et al. ................... 382/111 |
| 7,487,491 | B2 * | 2/2009 | Oaki et al. .................... 716/21 |
| 2006/0018530 | A1 | 1/2006 | Oaki et al. | |
| 2006/0215899 | A1 | 9/2006 | Oaki | |
| 2006/0215900 | A1 | 9/2006 | Oaki et al. | |
| 2006/0222233 | A1 | 10/2006 | Sugihara et al. | |

FOREIGN PATENT DOCUMENTS

| JP | 5-93696 | | 4/1993 |
| JP | 06050902 | * | 2/1994 |
| JP | 6-168315 | | 6/1994 |
| JP | 10-96613 | | 4/1998 |
| JP | 10-155139 | | 6/1998 |

(Continued)

OTHER PUBLICATIONS

U.S. Appl. No. 11/567,550, filed Dec. 6, 2006, Oaki.

(Continued)

*Primary Examiner*—Brian P Werner
(74) *Attorney, Agent, or Firm*—Oblon, Spivak, McClelland, Maier & Neustadt, L.L.P.

(57) ABSTRACT

A pattern image inspection apparatus with enhanced image correctability due to consolidation of alignment and image correction by using an image as divided by frequency regions while reducing image degradation and setup parameters is disclosed. The apparatus includes an image divider for creating for the test image and the reference image a plurality of frequency division images divided into frequency regions, a model parameter identifier for using 2D linear prediction models of the test image and the reference image to identify model parameters for each frequency division image, a model image generator for creating a model image based on the model parameters, and a comparison processor for performing inspection by comparing the model image to either the test image or the reference image with respect to each frequency division image. An image inspection method is also disclosed.

4 Claims, 7 Drawing Sheets

FOREIGN PATENT DOCUMENTS

| | | |
|---|---|---|
| JP | 2000-105832 | 4/2000 |
| JP | 2000-241136 | 9/2000 |
| JP | 2000-348177 | 12/2000 |
| JP | 2003-123073 | 4/2003 |
| JP | 2003-287419 | 10/2003 |
| JP | 2006-30518 | 2/2006 |

OTHER PUBLICATIONS

U.S. Appl. No. 11/360,580, filed Feb. 24, 2006, Junji Oaki, et al.
U.S. Appl. No. 11/360,813, filed Feb. 24, 2006, Junji Oaki, et al.
U.S. Appl. No. 11/360,657, filed Feb. 24, 2006, Junji Oaki, et al.
U.S. Appl. No. 11/360,679, filed Feb. 24, 2006, Junji Oaki, et al.

* cited by examiner

PATTERN INSPECTION APPARATUS AND METHOD WITH ENHANCED TEST IMAGE CORRECTABILITY USING FREQUENCY DIVISION SCHEME

CROSS-REFERENCE TO RELATED APPLICATION(S)

Priority is claimed to Japanese Patent Application No. 2006-227348, filed Aug. 24, 2006, the disclosure of which is incorporated herein by reference.

FIELD OF THE INVENTION

The present invention relates generally to image inspection technologies, and more particularly to a method and apparatus for inspecting for defects fine pattern images which are formed on reticles for use in the manufacture of highly integrated semiconductor circuit devices, such as large scale integrated (LSI) chips. This invention also relates to recording media for use therein.

RELATED ART

In general, microfabrication processes of LSI devices require increased costs, which in turn makes it inevitable for semiconductor manufacturers to improve production yields. There are several factors which lower yields, one of which factors is the presence of defects in reticle patterns for use during lithography-based exposure and transfer of an ultra-fine circuit pattern onto semiconductor wafers. In recent years, a decrease in LSI pattern size results in a likewise decrease in minimum feature size of defects to be detected. Due to this, a need is felt to further enhance the accuracy and precision of an image inspection apparatus for inspecting reticles for defects.

Pattern defect inspection methodology is categorized into two major approaches, one of which is based on die-to-die (DD) comparison schemes, and the other of which is on die-to-database (DB) comparison. The DD comparison is a method for detecting pattern defects by comparing two dies on a reticle. The DB comparison is a method of sensing defects through comparison of a die pattern to a database as generated from computer-aided design (CAD) data for the LSI design use.

As on-reticle circuit patterns further decrease in minimum feature sizes, a need arises to accurately detect those defects which are so small that these are buried in pixel position misalignment between images under comparison for inspection as well as image expansion/reduction and wave-like or "swell" noises plus sensing noises. In either the DD or DB comparison also, alignment in units of subpixels and image correction prior to the comparison inspection of an inspection reference image and to-be-tested image become very important.

One prior known approach to avoiding the problems is to use a method for performing subpixel alignment based on bicubic interpolation at the pre-stage of comparison inspection of a reference image and an image being tested and, thereafter, sequentially performing image expansion/reduction correction (as disclosed, for example, in JP-A-2000-241136), swell correction, resize correction and noise averaging processing. Unfortunately, repeated execution of these correcting processes would result in occurrence of accumulated or cumulative errors, which in turn causes unwanted reduction of image quality. Another problem faced with the prior art is the difficulty in setting of appropriate values of an increased number of model parameters required for each correction and also in setup of an adequate execution order of respective correction processes.

A technique for avoiding the problems is disclosed in JP-A-2006-030518, which discloses therein an invention for identifying the relationship of an inspection reference pattern image and a pattern image under testing, for establishing a mathematical formula model that achieves absorption or "fitting" of possible image pixel misalignment and expansion/contraction noises and sensing noises, and for comparing the test pattern image to a new version of reference pattern image which is obtained by simulation of such model.

BRIEF SUMMARY OF THE INVENTION

It is therefore an object of this invention to provide an improved technique for achieving effective image correction by use of an image which is divided by frequency regions thereof.

In accordance with one aspect of the invention, an image inspection apparatus for inspecting an image under testing for defects by comparison of the test image to an inspection reference image is provided. This apparatus includes an image division unit operative to create for the test image and the reference image a plurality of frequency division images as divided into frequency regions, a model parameter identification unit which uses two-dimensional (2D) linear prediction models of the test image and the reference image to identify more than one model parameter for each of the frequency division images, a model image generation unit for creating a model image based on the model parameter thus identified, and a comparison processor unit for performing inspection by comparing the model image to either the test image or the reference image with respect to each frequency division image.

In accordance with another aspect of the invention, an image inspection method includes the steps of creating for a test image and an inspection reference image a plurality of frequency division images as divided into frequency regions, using 2D linear prediction models of the test image and the reference image to identify more than one model parameter for each frequency division image, creating a model image based on the model parameter thus identified, and performing inspection by comparing the model image to either the test image or the reference image with respect to each frequency division image.

In accordance with a further aspect of the invention, a recording medium storing a software program for inspection of a test image by comparison to an inspection reference image is provided. The program is for execution of an operation having the steps of creating for the test image and the reference image a plurality of frequency division images as divided into frequency regions, using 2D linear prediction models of the test image and the reference image to identify one or more model parameters for each frequency division image, generating a model image by use of the model parameters identified, and performing inspection by comparing the model image to either the test image or the reference image in each frequency division image.

DETAILED DESCRIPTION OF THE INVENTION

An image inspection technique incorporating the principles of the invention will be described with reference to the accompanying drawing below.

Figure 1:
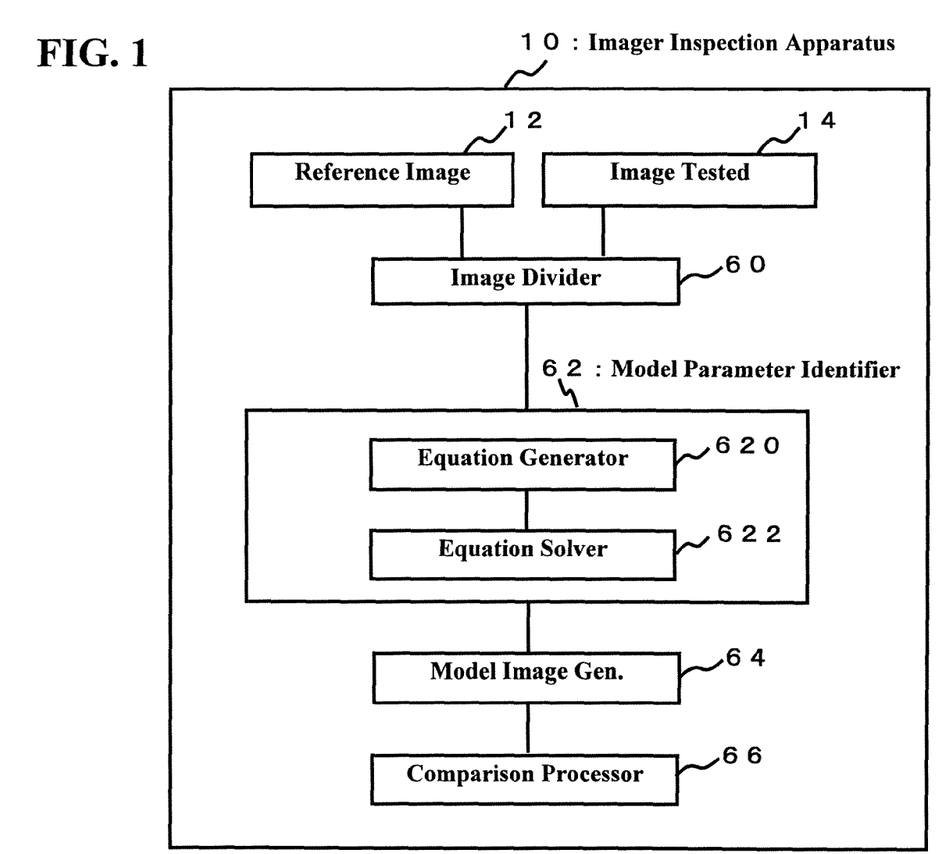
FIG. 1 is a block diagram showing a principal configuration of a reticle pattern image inspection apparatus embodying this invention.

A configuration of a pattern image inspection apparatus 10 is shown in FIG. 1. The image inspection apparatus 10 is the one that compares an inspection reference image 12 with a target pattern image being tested to thereby detect defects and failures of the image, if any. This apparatus offers its increased inspection accuracy which breaks through the limit of currently available direct comparison methods. To do this, it subdivides each of the reference image 12 and the to-be-tested image 14 into a plurality of image portions of spatial frequency regions to thereby create frequency division images. The image inspection apparatus 10 uses one or more two-dimensional (2D) linear prediction models to create certain prediction models for these frequency division images, which absorb position misalignment of picture elements or "pixels" as well as expansion/reduction noises and sensing noises thereof. Such pixel misalignment/noise absorption is known as the "fitting" among those skilled in the art. The inspection apparatus 10 uses these prediction models to generate an estimated model image and then performs comparison processing of this estimated model image to the image under testing, thereby enabling detection of defects of such image, if any. Additionally, the comparison of the reference image 12 and the to-be-tested image 14 typically includes two approaches, one of which is die-to-die comparison, and the other of which is die-to-database comparison while letting any one of these images under comparison be the reference image 12 with the other being the to-be-tested image 14. Which one of the images is set to the reference image may be arbitrarily determined on a case-by-case basis.

As shown in FIG. 1, the pattern image inspection apparatus 10 includes an image dividing unit 60 which receives the inspection reference image 12 and the to-be-tested image 14 and creates therefrom a plurality of frequency division images. The inspection apparatus 10 also includes a model parameter identification unit 62, which identifies by use of 2D linear prediction models one or several model parameters for the frequency division images of each of the reference image 12 and the test image 14. The apparatus further includes a model image creation unit 64 which creates a model image from the model parameters, and a comparison processing unit 66 for comparing the model image to either the reference image 12 or the test image 14 with respect to each frequency division image to thereby detect image defects or failures.

(Image Divider)

The image divider 60 is the one that divides an image into a plurality of spatial frequency regions and creates more than two frequency division images. Known image dividing methods include sub-band encoding and discrete wavelet conversion. The subband coding is a technique for using filters of low to high frequencies to divide an image into a plurality of portions of different frequency bands. The wavelet conversion is a scheme for dividing an image by sequential decomposition or "disassembling" of low frequency components of the image.

Figure 2:
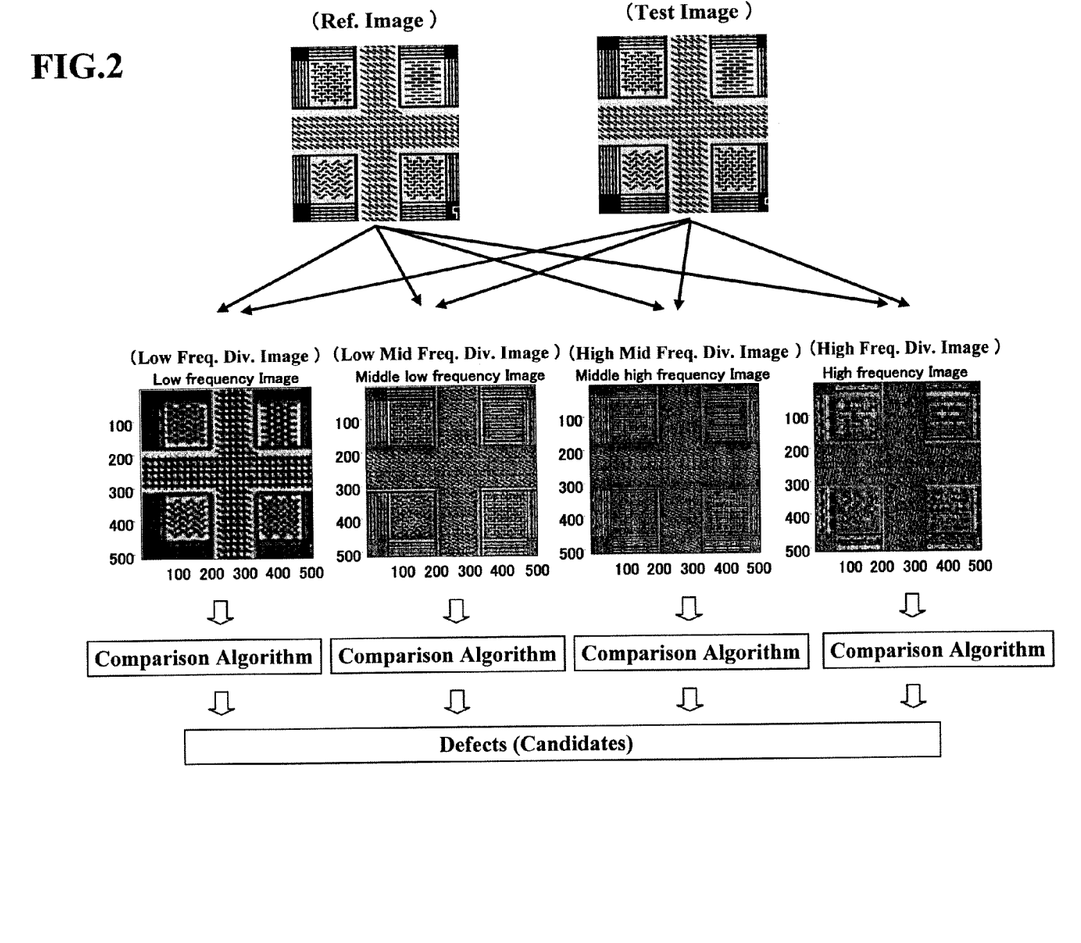
FIG. 2 is a diagram for explanation of a system procedure for image inspection using frequency-divided image components.

Turning to FIG. 2, there are shown four examples of the frequency division images for the reference image 12 or the to-be-tested image 14. These frequency division images are called the "high" frequency division image, "high middle" frequency division image, "low middle" frequency division image, and "low" frequency division image. The high frequency division image is such that specific image portions with relatively large variance (i.e., sharp contrast change) of image pattern are visually emphasized. The high middle frequency division image is with emphasis on certain image portions which are less in variance than those of the high frequency division image. The low middle frequency division image is with emphasis on image portions that are less in variance than those of the high middle frequency division image. The low frequency division image is with emphasis on the image portions that are the smallest in variance.

Figure 3:
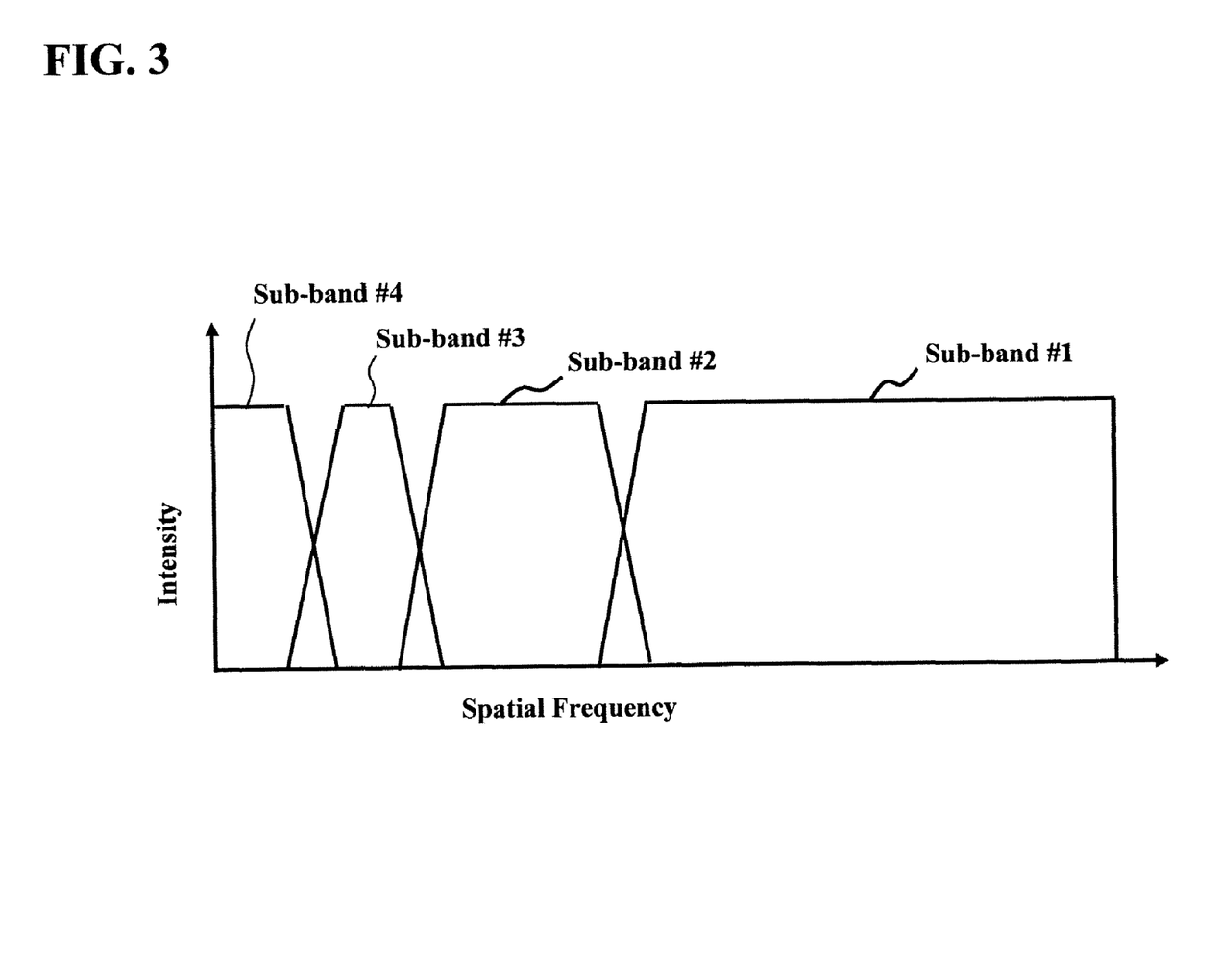
FIG. 3 is a diagram graphically showing a relationship of intensity versus spatial frequency in sub-band encoding by means of octave division.

FIG. 3 is a graph for explanation of the sub-band encoding based on octave division, which shows four exemplary spatial frequency regions, i.e., a sub-band 1 of high frequency region, a subband 2 of high middle frequency region, a subband 3 of low middle frequency region, and a subband 4 of low frequency region. An image may be divided into four frequency division images by using filters of these subbands, for example.

(Model Parameter Identifier)

The model parameter identifier 62 is the one that obtains through computation one or more model parameters for creation of an estimated model image. This estimated model image is an aimed correction image, which is reduced or minimized in pixel misalignment of less than one pixel size, expansion/contraction and swell noises as well as resizing processing and sensing noises. Note here that although the data for obtaining the model parameters can naturally contain therein defective pixels, such defective pixels are much less in number than an entirety of the data used for the identification, so they hardly appear in the estimated model image in most cases. Moreover, the estimated model image increases in signal to noise (S/N) ratios of its surroundings so that there is also an effect that defective pixels are emphasizable. The model parameter identifier 62 has a functional unit 620 for generation of a set of simultaneous equations and a function unit 622 for solving the equations, thereby obtaining model parameters.

The estimated model image is created per divided image with respect to the reference image 12 and the to-be-tested image 14. More specifically, in the example shown in FIG. 2, estimated model images are formed for the four frequency division images, i.e., the high, high-middle, low-middle and low frequency division images.

(Equation Generator for 2D Linear Prediction Model Setup)

The equation generator unit 620 shown in FIG. 1 handles the inspection reference image 12 as 2D input data for each frequency division image while regarding the to-be-tested image 14 as 2D output data, and then sets up 2D input/output linear prediction models. Four 2D linear prediction models are thus created. Examples of the input data and output data are grayscale or "graytone" levels of each pixel and the brightness or luminance thereof.

Figure 4:
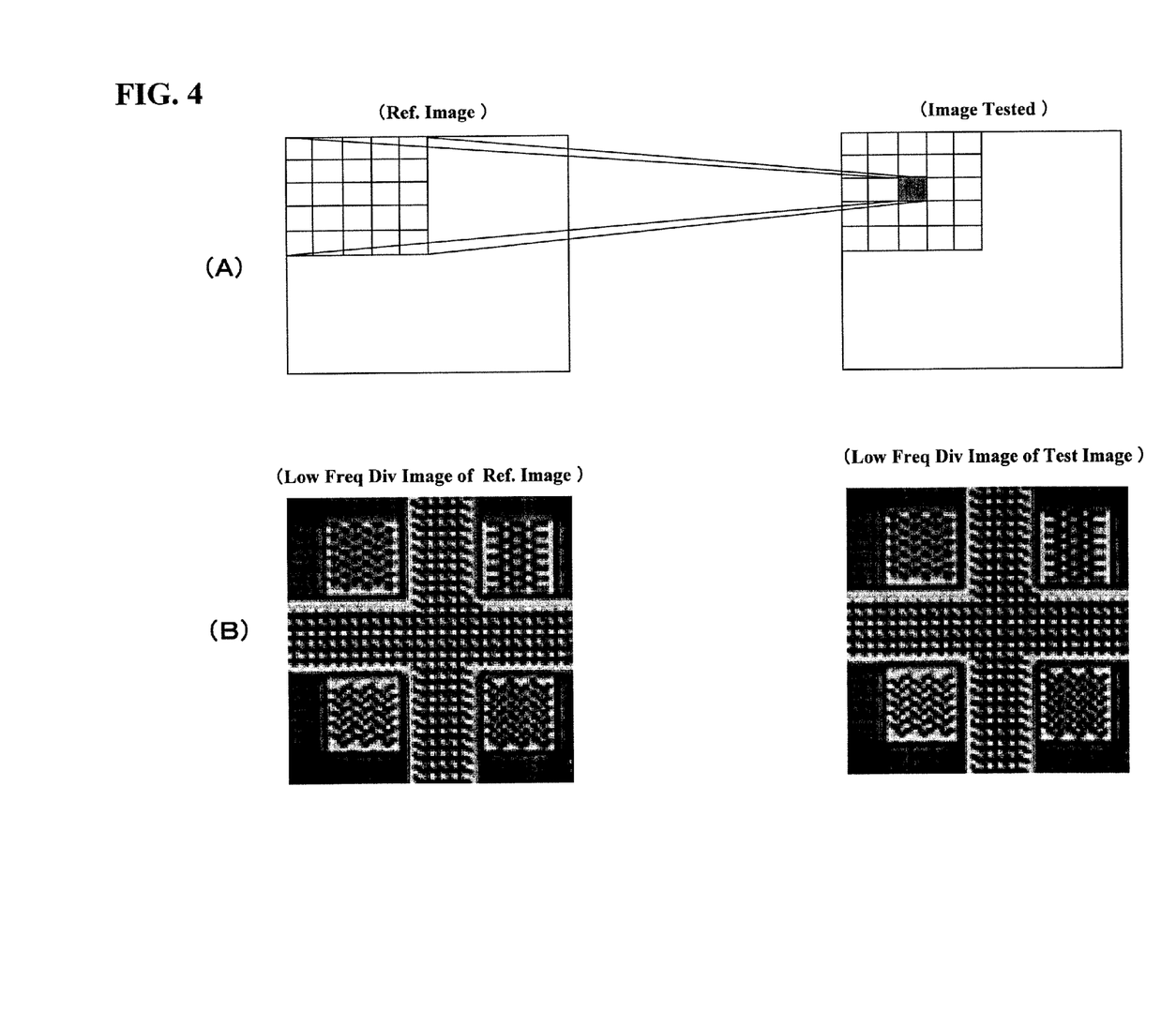
FIGS. 4A and 4B are diagrams each showing a two-dimensional (2D) linear prediction model using an area consisting of a matrix of five rows by five columns (5×5) of pixels.

FIG. 4A shows a 2D linear prediction model of five by five (5×5) using a region which consists of a matrix of five rows and five columns of pixels while letting the left-hand side be the inspection reference image 12 and letting the right side be the to-be-tested image 14. Suffices as used in this model (corresponding to the positions of 5×5 pixels) are shown in Table 1. While in FIG. 4B the low frequency division image is an object to be processed, the other frequency division images are processed in a similar way. The description below is directed to one frequency division image. Although 5×5 pixels are used here, a more or less number of ones may be employable.

TABLE 1

|   | 0 | 1 | 2 | 3 | 4 |
|---|---|---|---|---|---|
| 0 | i−2, j−2 | i−2, j−1 | i−2, j | i−2, j+1 | i−2, j+2 |
| 1 | i−1, j−2 | i−1, j−1 | i−1, j | i−1, j+1 | i−1, j+2 |
| 2 | i, j−2 | i, j−1 | i, j | i, j+1 | i, j+2 |
| 3 | i+1, j−2 | i+1, j−1 | i+1, j | i+1, j+1 | i+1, j+2 |
| 4 | i+2, j−2 | i+2, j−1 | i+2, j | i+2, j+1 | i+2, j+2 |

Let the 2D input data and 2D output data be $u(i,j)$ and $y(i,j)$ respectively. Letting the suffices of a target pixel be "i" and "j," the suffices of twenty five (25) pixels in total in two back and forth rows and two back and forth columns which surround this pixel are set as shown in Table 1. For the pixel data of an area of one set of 5×5 pixels, a relational expression such as Equation (1) is set. Those coefficients $b_{00}$ to $b_{44}$ of respective input data $u(i,j)$ in Equation (1) are the model parameters to be identified.

$$y_k = y(i, j) \quad (1)$$
$$= b_{00}u(i-2, j-2) + b_{01}u(i-2, j-1) + b_{02}u(i-2, j) +$$
$$b_{03}u(i-2, j+1) + b_{04}u(i-2, j+2) + b_{10}u(i-1, j-2) +$$
$$b_{11}u(i-1, j-1) + b_{12}u(i-1, j) + b_{13}u(i-1, j+1) +$$
$$b_{14}u(i-1, j+2) + b_{20}u(i, j-2) + b_{21}u(i, j-1) +$$
$$b_{22}u(i, j) + b_{23}u(i, j+1) + b_{24}u(i, j+2) + b_{30}u$$
$$(i+1, j-2) + b_{31}u(i+1, j-1) + b_{32}u(i+1, j) +$$
$$b_{33}u(i+1, j+1) + b_{34}u(i+1, j+2) + b_{40}u(i+2, j-2) +$$
$$b_{41}u(i+2, j-1) + b_{42}u(i+2, j) + b_{43}u(i+2, j+1) +$$
$$b_{44}u(i+2, j+2) + \varepsilon(i, j)$$

What is meant by Equation (1) is that the data of a single pixel in the to-be-tested image 14 (specific frequency division image), $y_k=y(i,j)$, is representable by the linear coupling of data of 5×5 pixels surrounding one pixel of the reference image 12 corresponding thereto (specific frequency division image) (see FIG. 4A). It is noted here that the residual difference $\varepsilon$ in Equation (1) is not evident in its statistical nature, and it will possibly happen that a model parameter identification result by means of a least squares method to be later described has a bias. However, in the illustrative embodiment of this invention, its principal importance lies in the Equation (1)-based input/output data fitting per se, and the parameter values will be rarely used directly, so no appreciable problems take place.

(Equation Solving Unit for Obtaining Model Parameters)

The equation solving unit 622 is the one that solves the set of simultaneous equations to thereby obtain the intended model parameters. When representing Equation (1) in a vectorial form, Equation (2) is obtained. Here, an unknown parameter vector $\alpha$ is given as $\alpha = [b_{00}, b_{01}, \ldots, b_{44}]^T$, and a data vector $x_k$ is equal to $[u(i-2,j-2), u(i-2,j-1), \ldots, u(i+2, j+2)]^T$.

$$x_k^T \alpha = y_k \quad (2)$$

The model parameter identification is achievable by defining in simultaneous equations form twenty five (25) sets of data of scanned coordinates (i, j) of the reference image 12 and to-be-tested image 14, which are specific frequency division images. In practical implementation, from a statistical viewpoint, a predetermined number, n (>25), of sets of data are prepared as in Equation (3) to be presented later. Then, solve 25-dimensional simultaneous equations based on the least squares method, thereby to identify the residual difference $\alpha$. Here, $A=[x_1, x_2, \ldots, x_n]^T$, $y=[y_1, y_2, \ldots, y_n]^T$, and $x_k^T \alpha = y_k$ ($k=1, 2, \ldots, n$). Other examples of the method of solving these equations in addition to the least squares method include, but not limited to, a maximal likelihood estimation method. Any kind of method may be used. Through the process, four sets of model parameters covering from the high to low frequency regions are obtained.

$$\begin{bmatrix} x_1^T \\ \vdots \\ x_n^T \end{bmatrix} \alpha = \begin{bmatrix} y_1 \\ \vdots \\ y_n \end{bmatrix} \Rightarrow A\alpha = y \Rightarrow \alpha = (A^T A)^{-1} A^T y \quad (3)$$

For instance, assume that each of the reference image 12 and the to-be-tested image 14 is a matrix of 512×512 pixels. If this is the case, the 5×5-dimensional model scanning results in the image's surroundings being reduced by two pixels, respectively. Thus, the number of the equations becomes as shown by Equation (4), which ensures obtainment of 258,064 sets of data. This makes it possible to provide a statistically sufficient number of ones.

$$n=(512-4)\times(512-4)=258064 \quad (4)$$

(Model Image Generator)

The model parameter generator substitutes in Equation (1) the identified model parameter $\alpha$ and the input/output image data used for the identification and then performs simulation processing for scanning pixel coordinates i, j to thereby generate four estimated model images in units of frequency regions. These estimated model images are the aimed correction images, which are processed by the least squares method-based fitting to decrease in pixel misalignment less than one pixel size, expansion/reduction and swell noises, and resize processing and sensing noises. Note here that although the data for use in simulation can contain defective pixels, these defective pixels are much less in number than an entirety of the data used for the identification, so they hardly appear in the estimated model images because almost none of them are subjected to the fitting. Moreover, the estimated model images increase in S/N ratios of the surroundings so that there is an additional effect that defective pixels are emphasizable.

(Comparison Processor)

As shown in FIG. 2, the comparator processor 66 operates to compare by a prespecified comparison algorithm the to-be-tested image and its corresponding model image with respect to each frequency division image to thereby find defects, if any. Performing comparison per frequency division image in this way makes it easier to find defects concerning frequency characteristics. For example, in case defects contain an increased number of high frequency components, the comparison with a high-frequency band image makes it easy to find such defects. A simplified comparison method is arranged to include the steps of replacing the to-be-tested image with an estimated model image with respect to each frequency division image, and determining a difference with the test image to thereby obtain effects of sub-pixel alignment, expansion/reduction and swell correction and resize correction, resulting in improvement in S/N ratio while letting defective portions be visually emphasized. The comparison algorithm as used herein is for applying well known 3×3 pixel characteristic filtering (such as average value filtering, longitudinal edge extraction filtering, lateral edge extraction filtering, diagonal edge extraction filtering, Laplacian filter, median filter, etc.) to each of the model image and the test image, and comparing difference images thereof, thereby making it possible to find various shapes of image defect portions. In this way, it is possible for this embodiment to appropriately select defect candidates through frequency region-divided unified signal processing without relying upon ad hoc spatial filtering, such as prior known edge detection schemes.

While in prior art methods the difference image is improvable by execution of expansion/contraction and swell correction and resize correction or else, repeated execution of such correction processes would result in generation of cumulative errors, which in turn causes appreciable image degradation. Another problem faced with the prior art is that it is difficult to set up suitable values of many parameters as needed for each correction and to determine an adequate execution order of respective correction processes.

(Image Inspection Method)

Figure 5:
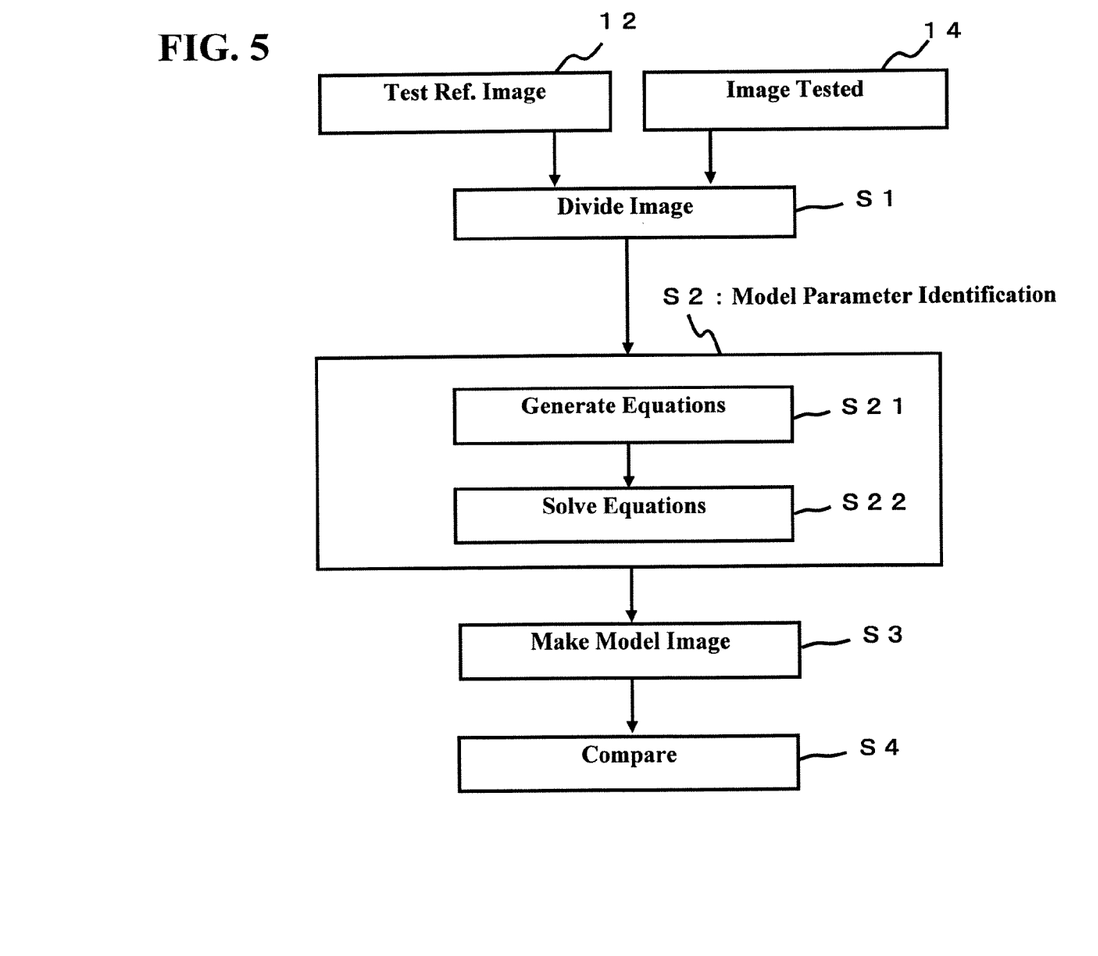
FIG. 5 is a flow diagram of major process steps of a pattern image inspection method also embodying the invention.

A system procedure of a method for inspecting respective frequency division images of an inspection reference image 12 and an image 14 to be tested is shown in FIG. 5. The procedure starts with an image division step S1, which receives the reference image 12 and the to-be-tested image 14 and then divides each image 12, 14 into image segments of respective frequency regions by subband encoding techniques or discrete wavelet conversion schemes, thereby to create an appropriate number of frequency division images. Then, the procedure goes to step S2 which identifies model parameters by use of the above-stated scheme of FIGS. 4A-4B and Table 1 along with Equations (1) to (3). This model parameter identification step S2 includes a step S21 which generates a set of simultaneous equations and a step S22 which solves the simultaneous equations generated. The simultaneous equations generated at step S21 include model parameters. At step S22 these equations are solved to obtain model parameters. Next, the procedure proceeds to step S3 which uses the model parameters thus obtained to produce an estimated model image (corrected image) of each frequency division image. As stated above, according to this embodiment, it is possible to provide an effective image correction method which combines or unifies the alignment and image correction together and which is capable of reducing or minimizing image degradation with the use of a reduced number of setup model parameters. The estimated model image thus generated and the to-be-tested image are then subjected to comparison processing using a prespecified comparison algorithm at step S4, thereby making it possible to readily find defective image portions, if any. One currently preferred approach to comparing the images is to use a process having the steps of forming a difference image of the estimated model image and the test image with respect to each frequency division image and then finding defective image portions. Especially, by performing the comparison in units of frequency division images, it is possible to accurately find defects by use of the frequency characteristics of such defects.

(Image Inspection Program-Written Recording Medium)

A recording medium with a software program for image inspection being written therein is a record carrier body which stores a program of the image inspection method having the process steps S1 to S4 of FIG. 5. By causing a computer to execute this program, the computer becomes a component or element of the image inspection apparatus 10 embodying the invention or, alternatively, it is possible to execute the image inspection method of this invention. Examples of the recording medium include, but not limited to, a compact disc read-only memory (CD-ROM), digital versatile disk (DVD), magneto-optical (MO) disk, large-capacity magnetic recording disk, portable hard disk drive (HDD) unit, and plug-in mass-storage device using nonvolatile semiconductor memory devices, such as electrically erasable programmable read-only memory (EEPROM) chips or "Flash" memories of the NOR or NAND type.

(Details of Image Inspection Apparatus)

Figure 6:
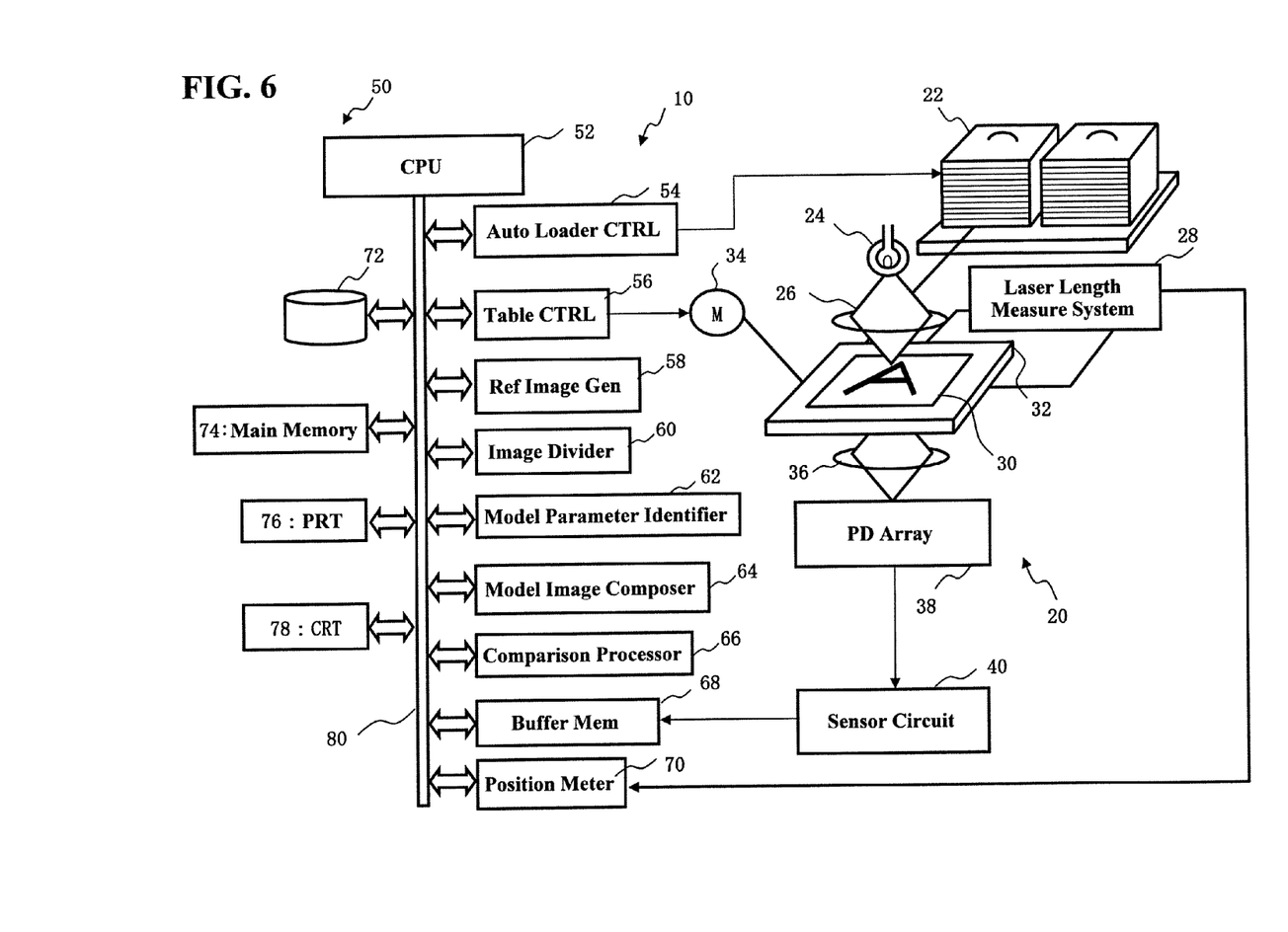
FIG. 6 is a diagram showing an overall configuration of the image inspection apparatus of FIG. 1.

Referring to FIG. 6, there is shown an overall configuration of the pattern image inspection apparatus 10. The image inspection apparatus 10 includes an optical image acquisition unit 20 which detects either reflection light or transmission light from a workpiece 30 under testing to thereby acquire its optical image, and a data processing unit 50 for storing and processing data, such as image data.

The optical image acquisition unit 20 is for acquiring an optical image of the workpiece 30 being tested, such as a reticle. The test workpiece 30 is put and held on an XYθ table 32. This table 32 is a three-axis (X-Y-θ) manipulator which is movable in X and/or Y direction and rotatable in θ direction while being driven by a table control unit 56, which operates in response to receipt of a command(s) from a central processor unit (CPU) 52. The table is driven by an XYθ motor assembly 34 in X, Y and θ directions. Examples of the motor 34 are known servo motors and stepper motors or like electric motors. The coordinates of a present location of the XYθ table 32 are measured, for example, by a laser-assisted length measurement system 28. Its output is sent to a position measurement unit 70. The position coordinate data as output from position measurement unit 70 is fed back to the table controller 56.

The workpiece 30 under testing is loaded by an auto-loader 22 onto the XYθ table 32 in an automated fashion under the control of an auto-loader control unit 54, and is automatically unloaded therefrom after completion of the inspection required. A light source 24 and an irradiation unit 26 are laid out over the XYθ table 32. Light as emitted from the light source 24 travels through a collection lens of the irradiator 26 to fall onto the test workpiece 30. Beneath the workpiece 30—supporting XYθ table 32, a signal detection unit is disposed, which is generally made up of a magnification optical lens assembly 36 and a photodiode (PD) array 38. Light that passed through the workpiece 30 travels through the magnification optics 36 and is then focussed onto a photosensitive surface of the PD array 38. The optics 36 is automatically focus-adjusted by its associated focus adjustment device (not shown) having a piezoelectric element or the like. This focus adjuster is controlled by an auto-focus control circuit (not shown) which is connected to the CPU 52. The focus adjustment may alternatively be achievable by use of a separately provided viewing monitor, e.g., observation scope. The PD array 38 serves as a photoelectric conversion unit, examples of which are a line sensor or an area sensor with a plurality of photosensors being disposed therein. By continuously moving the XYθ table 32 in X-axis direction, the PD array 38 detects or "captures" a pattern image of the workpiece 30, and then generates a measurement signal corresponding thereto.

This measurement signal is converted by a sensor circuit 40 into digital data, which is then input to a buffer memory 68 as the data of optical image sensed. The buffer memory 68 is replaceable with more than two buffer memories. An output of buffer memory 68 is sent to the comparison processing unit 66. The optical image data may be a stream of sign-less 8-bit data representing the brightness or luminance of each pixel. The image inspection apparatus 10 of this type is usually operable to read these pattern data out of the PD array 38 in a way synchronous with the clock frequency of about 10 to 30 MHz and apply thereto adequate data sorting for permitting the data to be handled as raster-scanned 2D image data.

The data processor 50 is generally made up of the CPU 52, the auto-loader controller 54, the table controller 56, a referential image creation unit 58, the image divider 60, the model parameter identifier 62, the model image generator 64, the comparison processor 66, the buffer memory 68, the position measurement unit 70, an external storage unit 72, a main storage device 74, a printer 76, a display device such as cathode ray tube (CRT) monitor, and a bundle of data transfer buses 80. Design pattern data of a reticle as an example is stored in a way such that an entirety of an inspection area is divided into short narrow portions—namely, strips. The image creator 58 arithmetically expands the design pattern data to create image data and then performs processing for causing it to resemble an optical image by rounding the corner edges of graphics patterns and/or slightly defocusing or "fogging" them, thereby to form a referential image, which is stored in a storage area for DB comparison. The referential image is for later use as the inspection reference or "fiducial" image 12. Note here that the referential image is created from the design data and is used as the reference image 12 in any events, although an optical image as read out of the reticle is also usable as the reference image. Consequently, the reference image 12 is the optical image in some cases and is the referential image in other cases.

The comparison processor 66 is the one that executes as its main tasks the DD comparison, DB comparison and defect analysis. The comparison processor 66 has parallel processing functionalities and is equipped with a plurality of identical functions and thus is capable of performing processing tasks in a parallel way. Additionally the image inspection apparatus 10 is configurable from electronic circuitry, software program, firmware, personal computer (PC) or any possible combinations of more than two of them.

(Image Acquisition Method)

Figure 7:
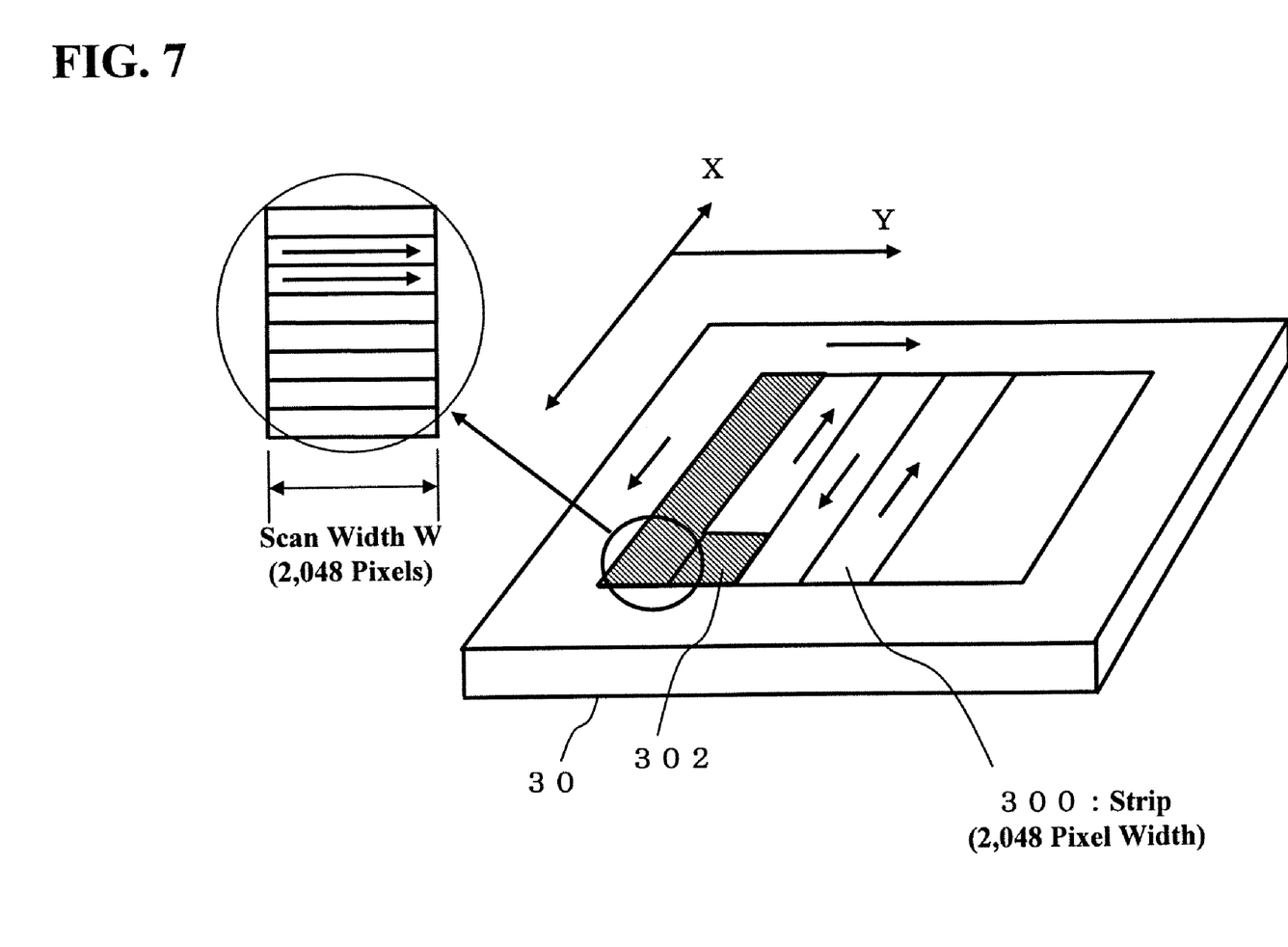
FIG. 7 depicts a perspective view of a reticle under testing in an optical image acquisition process.

The optical image acquisition of an ultrafine circuit pattern as drawn on the to-be-tested workpiece 30, such as a reticle, is achievable by the scanning using a line sensor. Here, for the convenience of explanation, the image of a strip-like segment (2,048 pixel width) 300 as obtained by elongate cutting in the X-axis direction (i.e., the direction of one side of the reticle) is called a one strip. The image of an almost square-shaped area 302 that is obtained by further finely cutting the one strip in Y-axis direction (the direction at right angles to X-axis direction) is called a one sub-strip. For instance, the one strip consists of a matrix of 2,048 rows and 2,048 columns of pixels. The inspection for determining whether defects are present or absent is performed on a per-substrip basis. Additionally, a single pixel has 256 different levels of grayscale.

Other various combinations are available in addition to the above-stated embodiment. Regarding the model setting and the mathematical computation scheme such as the least squares method, other schemes or techniques are applicable. Apparently this invention should not exclusively be limited to the embodiments as described herein. The invention is, therefore, to be limited only as indicated by the scope of the appended claims.

What is claimed is:

1. An image inspection apparatus for inspecting an image under testing for defects by comparison of the test image to a reference image, said apparatus comprising:
   an image division unit operative to create for the test image and the reference image a plurality of frequency division images as divided into frequency regions;
   a model parameter identification unit operative to use two-dimensional linear prediction models of the test image and the reference image to identify more than one model parameter for each of said frequency division images;
   a model image generation unit operative to create a model image based on the model parameter thus identified; and
   a comparison processor unit operative to perform inspection by comparing said model image to any one of the test image and the reference image with respect to each said frequency division image.

2. The apparatus according to claim 1, wherein said model parameter identification unit identifies said model parameter from a set of simultaneous equations describing therein an input versus output relationship relative to each said frequency division image while letting each pixel of the test image be an output and letting a linear coupling of inspection reference pattern pixels around said each pixel be an input.

3. An image inspection method for inspecting an image under testing for defects by comparison of the test image to a reference image, said method comprising:
   creating for the test image and the reference image a plurality of frequency division images as divided into frequency regions by an image division unit of an image inspection apparatus;
   using two-dimensional linear prediction models of the test image and the reference image to identify more than one model parameter for each of said frequency division images by a model parameter identification unit of the image inspection apparatus;
   creating a model image based on the model parameter thus identified by a model image generation unit of the image inspection apparatus; and
   performing inspection by comparing said model image to any one of the test image and the reference image with respect to each frequency division image by a comparison processor unit of the image inspection apparatus.

4. The method according to claim 3, wherein said model parameter is identified from a set of simultaneous equations describing therein an input/output relationship relative to each said frequency division image while letting each pixel of the test image be an output and letting a linear coupling of inspection reference pattern pixels around said each pixel be an input.

* * * * *